July 7, 1936. M. H. GROVE 2,047,101
PRESSURE REGULATOR
Filed Dec. 10, 1934   2 Sheets-Sheet 1
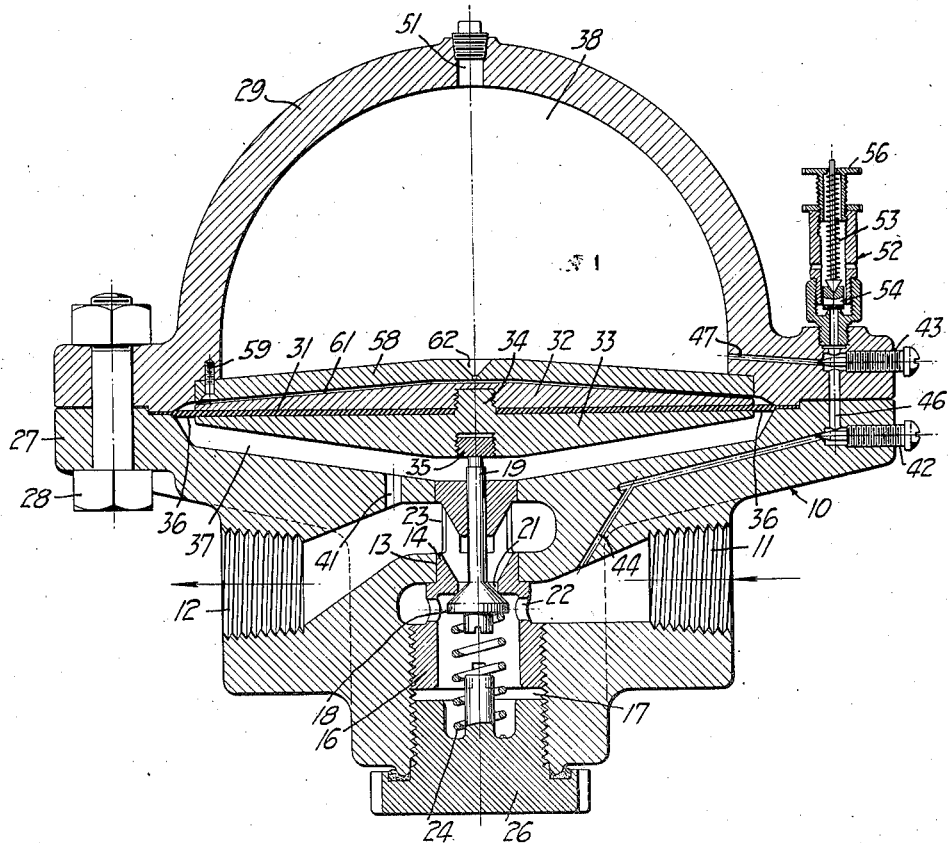
FIG_1_
INVENTOR.
Marvin H. Grove
BY
ATTORNEY.

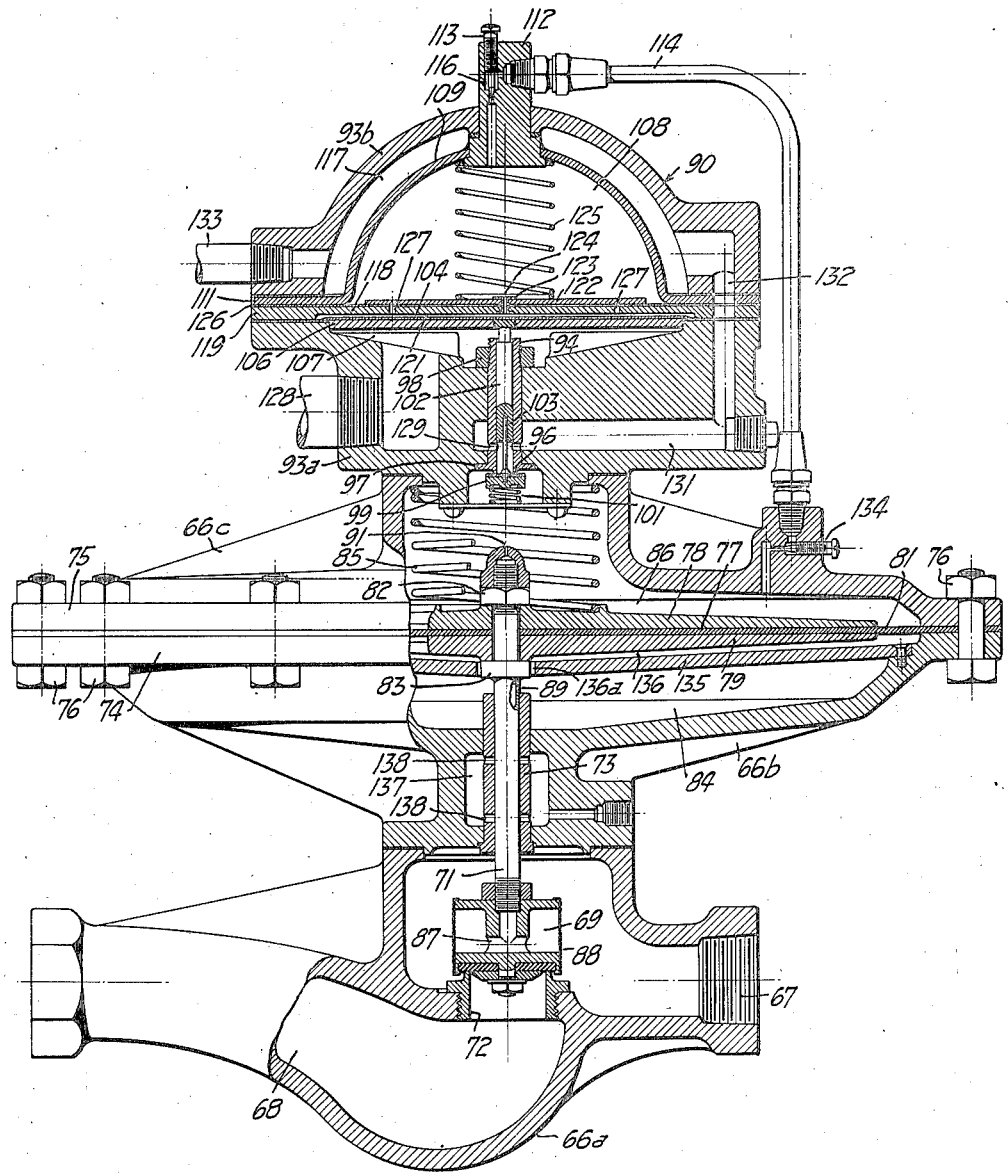
FIG_2_

Patented July 7, 1936

2,047,101

UNITED STATES PATENT OFFICE 2,047,101

PRESSURE REGULATOR

Marvin H. Grove, Berkeley, Calif.

Application December 10, 1934, Serial No. 756,849

8 Claims. (Cl. 50—12)

This invention relates generally to devices for automatically regulating flow of fluid. In a typical example, the invention is incorporated in a pressure regulator serving to supply fluid at a substantially constant pressure to a point of demand, from a relatively higher pressure source of fluid supply.

In the past, regulators of the above character have not been entirely satisfactory, particularly where accuracy of regulation is desired, or where operation is attempted over a wide latitude of pressures. Upon opening the outflow side of a conventional regulator utilizing a pressure operated diaphragm, the valve member tends to pop open too far from its seat, with the result that a surge of fluid through the regulator builds up the outflow pressure to a value above the limit desired. Frequently the surging is not of only momentary duration but reacts upon the regulator to cause uncontrolled fluttering or chattering, with resultant loss of proper regulation and deterioration of the seating surfaces. Somewhat similar effects are frequently experienced when the flow demand upon the outflow side is a minimum value or is being reduced by shutting down the outflow side, in which event the valve member tends to slap against its seat. Attempts to alleviate these difficulties by increasing the weight or mass of the moving parts are unsatisfactory, and an increase in inertia necessarily involves a loss in sensitivity of response and accuracy.

It is an object of the present invention to provide a flow regulating device which will avoid the difficulties outlined above and which will make possible regulation with a relatively high degree of accuracy.

A further object of the invention is to provide a flow regulator which will avoid fluttering or slapping of the valve member upon its stationary seat, and which at the same time will make possible operation over a wide latitude of pressures and flow demands.

Further objects of the invention will appear from the following description in which the various embodiments of the invention have been set forth in detail in conjunction with the accompanying drawings.

Referring to the drawings:

Fig. 1 is a side elevational view, in cross section, illustrating a regulator incorporating the present invention.

Fig. 2 is a side elevational view, in cross section, illustrating a modified form of regulator incorporating the present invention.

The regulator illustrated in Fig. 1 is of the direct acting type, that is, without a so-called pilot valve, and is designed particularly for use on gas flow lines where the inflow pressure is of relatively high value. To proceed with a detailed description, the device includes a body 10, provided with inflow and outflow openings 11 and 12 respectively. When in use, piping or conduit connected to the inflow opening 11 serves to supply gas at a relatively high pressure, while piping or conduit connected to the outflow opening 12 supplies a low pressure system from which gas is to be consumed. As representative of suitable valve means for controlling flow of gas through the body, the body is provided with a bore 13 serving to accommodate a valve cage 14. The lower end of this cage is shown provided with a head 16 of enlarged diameter, which is externally threaded to screw into the threaded bore 17. The movable valve member 18 is associated with the cage 14 and is carried upon the lower end of a stem 19. The cage serves to guide the stem 19 and also affords a stationary annular valve seat 21 with which the valve member 18 cooperates. When the valve member is displaced with respect to its seat, inflow of gas occurs through ports 22, past the valve member and through seat 21, and then through ports 23 to the outflow openings 12. A compression spring 24 affords a suitable bias of substantially constant value, for normally retaining the valve member 18 in closed position. The upper end of this spring is shown seated upon the lower end of the valve member 18, while the lower end of the spring is shown seated upon a sealed closure plug 26. It is evident that upon removing the closure plug 26, the cage 14, together with the valve member 18, can be removed from the remainder of the regulator.

The pressure responsive means for causing automatic movements of the valve member 18, is constructed as follows:—The upper part of the body 10 is enlarged to afford an annular flange 27, and secured to this flange, as by means of bolts 28, there is a dome 29. Likewise carried by the upper portion of the body 10, with its marginal edge clamped between the flange 27 and the dome 29, there is a flexible diaphragm 31. The material utilized for this diaphragm may vary in accordance with different designs, but in this particular instance it is formed of resilient vulcanized rubber reinforced by cloth. Positioned upon the upper and lower sides of the diaphragm 31, are the discs 32 and 33, which are rigid and which may be made of suitable metal. These discs are securely clamped together upon the opposite sides of the diaphragm, as by means of a threaded stud 34, and they are of such diameter as to leave a marginal diaphragm portion 36 for flexing movements. Since the discs 32 and 33 move with the diaphragm, they can be considered in general as forming a part of the diaphragm structure. The lower disc 33 is shown provided with a hardened plug 35, to abut the upper end of stem 19.

It is evident that the diaphragm 31 serves to divide the space enclosed between the dome 29 and the body 10, into two chambers 37 and 38. In a typical regulator, chamber 37 is connected to the outflow side of the regulator, as by means of a duct 41. Chamber 38 is adapted to contain a predetermined amount of trapped gas under pressure, and it is the pressure within this chamber that determines the pressure which the regulator will maintain upon the outflow side. To enable convenient changes in the pressure in chamber 38, there is shown an arrangement of ducts together with manually operated valves, to admit additional gas into chamber 38 from the inflow side of the regulator, or to permit excess gas to be vented to the atmosphere. Thus, mounted in the flange 27 of the body, and in the corresponding flange for the dome 29, are the manually operable needle valves 42 and 43. Needle valve 42 controls flow of gas from the duct 44 to a duct 46, while needle valve 43 controls flow from duct 46 through duct 47 to the chamber 38. It is apparent that by opening both of the needle valves 42 and 43, gas from the inflow side of the regulator can be bled into the chamber 38, to attain a desired pressure, as shown by a pressure gauge attached to the normally closed opening 51. In venting gas from the chamber 38, it is desirable in many instances, as for example where relatively high pressures are involved, to provide an adjustable max-pressure release valve 52. The bias afforded by spring 53 on the valve member 54 of this device can be regulated by the threaded sleeve 56. The device is shown mounted upon the flange of dome 29, whereby when needle valve 43 is open, with needle valve 42 closed, adjustments can be made to vent a desired quantity of gas. Likewise, when introducing gas into the dome 29 from the inflow side of the regulator, the device 52 will automatically vent gas to the atmosphere in the event the pressure in chamber 38 exceeds a stated value.

From the above description it is apparent that fluid pressure in chamber 37 tends to urge the diaphragm 31 in a direction to close the valve 18, while the pressure of gas in chamber 38 tends to urge the diaphragm in a direction to open the valve member. Pressure in chamber 37 is of course varied in accordance with variations on the outflow side of the regulator, while the pressure in chamber 38 remains substantially constant and serves in effect to form a bias on the diaphragm and the valve 18, to determine the outflow pressure to be maintained.

In addition to the bias afforded by the pressure of gas in chamber 38, auxiliary means is provided tending to prevent abrupt flexing movements of the diaphragm, with attendant abrupt movements of the valve member 18 from or against its seat. This auxiliary means consists of a rigid baffle wall 58, which is disposed within the gas chamber 38, and which extends across the upper side of the diaphragm. To retain this baffle wall in proper position, its marginal edge is shown mounted upon the lower inner edge of the dome 29, as by means of screws 59. The lower surface contour of the baffle wall 58 is substantially the same as the contour of the upper surface of disc 32, there being a relatively small clearance between these surfaces to form the space 61. Space 61 is sealed, except that it has restricted communication with the remainder of the chamber 38, by means of an orifice 62.

Operation of the regulator described above can now be explained as follows:—It will be presumed that the inflow pressure connected to passage 11 is of relatively high value of, say, 3500 lbs. per square inch, and that the pressure being maintained upon the outflow is of a substantially lower value of, say, 200 lbs. per square inch. The pressure of trapped gas in chamber 38 will be of a value corresponding generally to that of the outflow pressure, that is, 200 lbs. per square inch. When no gas is being discharged from the outflow side, the regulator is of course in static condition, with valve member 18 engaging its stationary seat 21, and with the diaphragm 31 at the upper limit of its movement. Under such conditions, the gas pressure in the space 61 will correspond to the pressure in the remainder of the gas chamber 38, by virtue of the communicating orifice 62. Now if a flow of gas is established from the outflow side of the regulator, there is a tendency for valve member 18 to pop open, and, as has been previously pointed out, in conventional regulators such sudden opening movement occurs to such a degree as to cause a sudden surge of fluid to flow through the regulator, with resultant building up of the outflow pressure considerably beyond the desired value. However, with the present invention, initial opening movement of the valve member 18, by virtue of a lower pressure in chamber 37, causes a rapid increase in the volume of space 61, with the result that the gas pressure in the space is greatly reduced. Such rapid rarefaction or reduction of pressure upon the upper side of the diaphragm, which occurs independently of the relatively fixed gas pressure in the remainder of the chamber 38, necessarily immediately alters the initial resulting force tending to urge the diaphragm 31 downwardly, with the result that opening movement of the valve member 18 is checked, and this member does not move so far as to cause a detrimental surge of gas to flow through the regulator. Consequently, under such conditions of operation the outflow pressure remains substantially at the desired value, irrespective of the suddenness with which the demand is imposed.

As a second condition of operation, it will be presumed that a demand is placed upon the outflow side of the regulator, but the flow maintained at a relatively small value. With conventional regulators, such a condition is conducive to erratic operation and to repeated slapping of the valve member upon its seat. This is deemed due largely to opening of the valve member to too great an extent, with closing of the valve member immediately following flow of a surge of gas to the outflow side With the present invention, repeated slapping of the valve member upon its seat is minimized, not only because surging is prevented in the first instance, but also because rapid movement of the valve member against its seat is cushioned by the building up of pressure in space 61, to values materially above the pressure in the remainder of the gas chamber 38.

For reasons explained above, it will also be apparent that my regulator will operate smoothly to give accurate regulation for other conditions of operation, including a shut-down of the outflow side after a period of gas demand. During periods of medium or large demands upon the outflow side, the valve member 18 seeks a position of equilibrium, and the pressure in space 61, which is now of considerably larger volume, assumes substantially the same value as the pressure in the remainder of the chamber 38.

By way of example, I have constructed one regulator in accordance with the details illustrated in Fig. 1, which has been operated with good results for a variation of inflow pressure from 2500 to 3500 lbs. per square inch, over a range of outflow pressures varying from 100 to 1200 lbs. per square inch. For a given setting of the pressure in chamber 38, the variations in outflow pressure over a wide range of demand, and over a wide range of variations of inflow pressures, do not exceed 5 lbs. In this particular device the diaphragm measures approximately 7¼ inches in diameter, the valve member 18 has a maximum travel of about ⅜ inch; the clearance, represented by space 61, measures about 1/32 inch, and the orifice 62 is about 0.052 inch in diameter.

It is of course evident that an increase in the vertical dimensioning of space 61 tends to minimize the compensating forces produced as explained above. It is for this reason that in practice the clearance is made relatively small, it being substantially less than the total travel of the diaphragm and valve member, in the example given above.

Not only does the modification described above give accurate regulation over the range of pressures indicated, with an absence of uncontrolled fluttering or slapping of the valve member against its seat, but utmost reliability is afforded with a minimum of wear upon the moving parts. Since chamber 38 is sealed with respect to line flow and with respect to the atmosphere, there is no danger that orifice 62 may become clogged with foreign solids or that foreign material may find its way into the space 61.

In the modification of Fig. 2, the invention has been incorporated with a regulator utilizing a pilot valve loaded by trapped gas under pressure. In this instance, the body of the regulator is formed of one part 66a, which is provided with inflow and outflow passages 67 and 68. The main valve member 69 is carried upon one end of a stem 71 and co-operates with a removable stationary seating ring 72. Clamped upon and sealed with respect to the body part 66a, there is a second body part 66b, which is bored to receive a bushing 73 for guiding the valve stem 71. The body part 66b is of enlarged diameter and is provided with a circumferential annular flange 74. A further body part 66c is provided with a flange 75, and the two flanges 74 and 75 are clamped together by suitable means, such as bolts 76.

For effecting movement of the valve stem 71, there is a flexible diaphragm 77, the marginal edge of which is gripped between the flanges 74 and 75. The upper and lower faces of this diaphragm are engaged by the relatively rigid discs 78 and 79, thus confining flexing movement to the outer annular portion 81. The upper end of stem 71 extends through this diaphragm assembly, and is threaded to receive the clamping nut 82 and the collar 83. Spring 85 serves to bias the valve member 69 towards closed position. Since the body parts 66b and 66c are hollow, the diaphragm serves to divide the space enclosed by the same into two fluid compartments 84 and 86.

Provision for applying fluid pressures to diaphragm 77 is as follows:—Stem 71 is in the form of a tube having its lower end in communication with the inflow side of the regulator, through ports 87. If desired, the valve member 69 may be provided with a screen 88 for the removal of foreign material. Communication between the interior of stem 71 and the chamber 84 is established through the restricted orifice 89. Likewise, restricted communication between the interior of stem 71 and the fluid chamber 86 is established through orifice 91. With such an arrangement, pressures in the chambers 84 and 86 tend to become equalized and controlled venting of the chamber 86 serves to control positioning of the valve member 69.

The pilot valve device, designated generally at 90, for effecting such controlled venting of the chamber 86, incorporates certain features of the invention previously described with respect to Fig. 1 and is constructed as follows:—The body of this assembly includes parts 93a and 93b which have annular flanges clamped together to form a sealed connection. The body part 93a is bored to receive a bushing 94 which is formed to afford both a guide and a lower annular valve seat 96. The lower end of bushing 94 is formed to afford a shoulder 97, while the upper end is shown engaged by nut 98, whereby the bushing is maintained in proper assembled position with respect to the body part 93a. Cooperating with the stationary seat 96, there is a movable valve member 99, which is normally urged towards closed position by the compression spring 101. Slidably included in bushing 94 there is a plunger 102, the lower end of which is in abutment with a pin 103 extending upwardly from the valve member 99.

Positioned within the space enclosed by the body parts 93a and 93b, there is a flexible diaphragm 104, which has its annular marginal edge clamped between the two body parts. The lower face of diaphragm 104 is engaged by a relatively rigid disc 106, the central portion of which abuts the upper end of plunger 102. Diaphragm 104 serves to divide the interior of the pilot valve assembly into two chambers 107 and 108, chamber 108 being adapted to contain a predetermined quantity of trapped gas under pressure. Since in the particular example being described it is desirable to maintain the temperature of the gas in chamber 108 at the same, or approximately the same, temperature as that of the gas flowing through the regulator, the body 93b is shown provided with an inner dome 109 formed of suitable material, such as bronze or steel forging. The lower flange portion 111 of the dome 109 can likewise be conveniently clamped between the body parts 93a and 93b to afford a proper seal with respect to the diaphragm 104. In order to enable a change in the amount of gas in chamber 108, a plug 112 is provided, which has its inner end welded or otherwise sealed to the dome 109 and which extends to the interior of the body part 93b. A needle valve 113 is shown for controlling admission of gas from tube 114, through duct 116, to the interior of chamber 108. The jacket or space 117, between the outer wall of dome 109 and the outer shell formed by body part 93b, can be utilized as a passage for conveying a portion of the line fluid, as will be presently explained.

As auxiliary means associated with the diaphragm 104 to properly control movements of the valve member 99, I have shown a relatively rigid baffle wall 118. The annular margin 119 of this baffle wall can likewise be clamped between flange 111 and the margin of diaphragm 104 to afford a sealed connection, while the lower face of the baffle wall is arranged to have a small clearance with respect to the upper face of diaphragm 104, thus affording the space 121.

It may be explained at this point that the regulator of Fig. 2 is designed for relatively low pressure operation, as distinguished from high pressure operation intended for the modification of Fig. 1. Therefore, if one were to vent space 121 by a simple restricted orifice, tendency for the pilot valve 99 to pop over too far from closed position would be prevented, but the cushioning effect afforded upon closing of the pilot valve member 99 might tend to render the regulator sluggish in responding to shut-off on the outflow side. To avoid this difficulty, a check valve is utilized in conjunction with the baffle wall 118, to enable substantially unrestricted discharge of gas from space 121 as the valve member 99 moves upwardly against its seat, with restricted flow of gas into space 121 when the diaphragm is caused to move downwardly in a direction to open the valve member. The simple type of check valve illustrated consists of a spring pressed disc shaped flap 122, formed of metal or like material, which has its central portion loosely retained to the central portion of the baffle wall 118 by the eyelet-like member 123. Member 123 likewise affords a restricted orifice 124 to establish communication between the space 121 and the gas chamber 108. The annular margin of flap 122 may engage the inner edge portion of a gasket 126, this gasket being interposed between the dome flange 111 and the margin 119 of the baffle wall 118. A light compression spring 125 can be employed for normally retaining the flap in closed position. Beneath the flap 122 the baffle 118 is provided with ports 127. Thus, sudden upward movement of diaphragm 104, tending to compress gas in space 121, causes flap 122 to be lifted by pneumatic pressure, with the result that gas in the space 121 is vented without restriction to the remainder of chamber 108. However, rapid downward movement of the diaphragm serves to rarefy the gas in space 121, since under such conditions gas can enter space 121 only through the restricted orifice 124.

The fluid chamber 107 below the diaphragm 104, for ordinary regulation of pressure, is connected with the outflow side, as indicated by the pipe 128. Opening of pilot valve member 99 serves to vent gas from chamber 86, and, rather than to conduct such vented gas to the outflow side of the regulator or to the atmosphere, it can be caused to flow through passage 117 about the dome 109. Thus, vent ports 129 are shown in the bushing 94, and by means of connected passages 131 and 132, gas discharged through these ports is conveyed to the passage 117. From this passage, pipe connection 133 conveys the gas to the outflow side of the regulator. Tube 114, for charging the gas chamber 108, is shown connected to the body part 66c, so that by means of a needle valve 134 high pressure gas may be admitted from chamber 86. At this point it may be explained that in charging chamber 108, both needle valves 113 and 134 are opened. To permit a venting of gas from chamber 108, needle valve 134 remains closed, while needle valve 113 is opened sufficiently to permit leakage of gas to the atmosphere.

If desired, means can be employed in conjunction with diaphragm 77 to prevent the main valve from popping open too far when compartment 84 is vented. Thus a rigid baffle wall 135 is shown extending over the lower side of the diaphragm, to form a confined space 136, which is vented through the restricted orifice 136a.

To insure proper lubrication of stem 71 for the main valve 69, an intermediate chamber 137 can be formed about bushing 73, for receiving a suitable lubricant. Ducts 138 in the bushing serve to convey lubricant to the exterior of the stem 71.

Operation of the regulator described with respect to Fig. 2 can now be briefly explained as follows:—Assuming a given pressure for the trapped gas in chamber 108, that is, with the regulator set for delivering gas at a pressure of, say, 5 lbs. per square inch to the outflow side, when no demand is placed upon the outflow side, valve 69 is closed upon its seat, the pressures in chambers 84 and 86 are equal and substantially the same as the inflow pressure to the regulator, pilot valve 99 is closed, and the pressures in chambers 107, 108 and in space 121 are substantially equal. If now a demand is placed upon the outflow side, a slight initial fall of pressure occurs in chamber 107, with the result that the diaphragm 104 is flexed downwardly to open the pilot valve 99, thus causing gas from chamber 86 to be vented. At such time, pilot member 99 will not pop open too far, because of the rarefaction which such opening movement immediately causes in the space 121. Venting of gas from chamber 86 upsets the balance upon diaphragm 77, with the result that this diaphragm is also flexed to open the main valve member 69. Here again, the main valve member will not pop open too far, because of the manner in which the pilot valve 99 is controlled and because of rarefaction of gas in space 136. After a period of comparatively normal demand upon the outflow side, if this demand ceases, building up of pressure in chamber 107 immediately flexes diaphragm 104 upwardly, to cause immediate closing of pilot valve 99, with the result that pressures in chambers 84 and 86 are rapidly equalized to close the main valve 69. As has been previously pointed out, closing movement of the pilot valve member 99 under such conditions occurs rapidly, due to the lifting of flap 122 to enable substantially unrestricted discharge of gas from space 121.

I claim:

1. In a fluid pressure regulator, a body having an inflow passage for connection with a source of fluid under pressure and having an outflow passage for connection with a low pressure fluid supply system, a valve member within the body and movable in opposite directions between open and closed positions to control flow of fluid through the same, a flexible diaphragm connected to the valve member to effect movements of the same, means forming a fluid chamber on one side of said diaphragm, said fluid chamber having communication with the outflow side of the regulator, fluid pressure within said chamber tending to flex the diaphragm in a direction to effect closing of said valve member, means for biasing said diaphragm and said valve member in a direction towards open position of the same, and auxiliary means associated with the diaphragm serving to oppose abrupt flexing of the same, said last means including a rigid wall extending over one side of the diaphragm to form a confined fluid space, and means including a check valve for providing restricted inflow and substantially unrestricted outflow of fluid with respect to said space.

2. In a fluid pressure regulator, a body having an inflow passage for connection with a source of fluid under pressure and also having an outflow passage for connection with a low pressure point of fluid supply, a valve member within the body and movable in opposite directions between open and closed positions to control flow of fluid through the body, a flexible diaphragm connected to the valve member to effect movements of the same, means forming a fluid chamber on one side of the diaphragm, said chamber being in communication with the outflow side of the regulator, fluid pressure within said chamber tending to flex the diaphragm in a direction to move the valve member towards closed position, a closed gas chamber formed upon the other side of the diaphragm, said last-mentioned chamber being adapted to contain a predetermined amount of trapped gas under pressure, thereby tending to flex the diaphragm in a direction to effect opening of the valve member, a relatively rigid baffle wall disposed in the last-mentioned gas chamber in spaced relationship with the diaphragm but in relatively close proximity to the same whereby a confined gas space is formed between said baffle and said diaphragm, a restricted orifice establishing communication between said confined space and the remainder of the last-mentioned gas chamber, and a pressure-operated check valve serving to permit substantially unrestricted flow of gas from said confined space to the remainder of the gas chamber.

3. In a fluid pressure regulator, a body having passages for inflow and outflow of fluid, a valve member within the body and having a substantial travel of movement in opposite directions between open and closed positions to control flow of fluid through the same, a flexible diaphragm connected to the valve member for conjoint movement with the same, a rigid wall extending over one side of the diaphragm and parallel thereto to form a confined fluid space, the distance between the adjacent surfaces of the diaphragm and the wall being a minor fraction of the travel of the valve member when the valve member is closed, comparable to the practice of affording a distance of one thirty-second of an inch for a total valve travel of three-eighths of an inch, and a restricted orifice serving to vent said space.

4. In a fluid pressure regulator, a body having passages for inflow and outflow of fluid, a valve member within the body and having a substantial travel of movement in opposite directions between open and closed positions to control flow of fluid through the same, a flexible diaphragm connected to the valve member for conjoint movement with the same, a rigid wall extending substantially entirely over one side of the diaphragm and parallel thereto to form a confined fluid space, the clearance between the adjacent surfaces of the diaphragm and the wall when the valve member is closed, being a minor fraction of the total flexing movement of the diaphragm when the valve member is moved from closed to open positions, and a restricted orifice serving to vent said space, said restricted orifice being comparable to the practice of providing an orifice opening of about 0.052 inch in diameter, where the diaphragm is about 7¼ inches in diameter, and serving to materially impede fluid flow into said space.

5. In a fluid pressure regulator, a body having an inflow passage for connection to a relatively high pressure source of fluid and also having an outflow passage for connection with a low pressure point of fluid supply, a stationary valve seat formed within said body, a movable valve member cooperating with the seat and having a travel of movement in opposite directions between open and closed positions to control flow of fluid through the body, a flexible diaphragm connected to the valve member to effect movements of the same, means forming a fluid chamber on one side of the diaphragm, said chamber being in communication with the outflow side of the regulator and fluid pressure within the same tending to flex the diaphragm in a direction to move the valve member towards closed position with respect to the valve seat, means forming a closed gas chamber upon the other side of the diaphragm, said last-mentioned gas chamber serving to contain a predetermined amount of trapped gas under pressure, whereby such pressure tends to flex the diaphragm in a direction to move the valve member towards open position, a rigid baffle wall within said last-mentioned chamber and extending across one side of the diaphragm, the clearance between the adjacent faces of said baffle and said diaphragm, when the valve member is closed against said seat, being substantially less than one-half of the total flexing movement of the diaphragm in moving the valve member between full-open and closed positions, and orifice means for establishing flow attenuating communication between the space formed by the said clearance and the remainder of said gas chamber, the aforesaid clearance afforded, and said restricted orifice, being comparable to the practice of providing a clearance of $\frac{1}{32}$ of an inch with an orifice opening of 0.052 inch in diameter, where the diaphragm is about 7½ inches in diameter and the diaphragm has a total flexing movement of ⅜ of an inch, whereby flexing of the diaphragm while the valve member is in the proximity of its seat is accompanied by wide variations in pressure within said space.

6. In a fluid pressure regulator, a body having passages for inflow and outflow of fluid, a valve member within the body and having a travel of movement in opposite directions between open and closed positions to control flow of fluid through the same, a flexible diaphragm connected to the valve member for conjoint movement with the same, a rigid wall extending substantially entirely over one side of the diaphragm to form a confined fluid space between the wall and the diaphragm, an orifice of relatively small diameter serving to vent said space and serving to materially impede fluid flow into said space, and means forming a fluid space upon the other side of the diaphragm, said fluid space having a venting orifice of materially greater diameter than said first-named orifice to freely subject the diaphragm to pressure.

7. In a fluid pressure regulator, a body having passages for inflow and outflow of fluid, a valve member within the body and having a substantial travel of movement in opposite directions between open and closed positions to control flow of fluid through the same, a flexible diaphragm connected to the valve member for conjoint movement with the same, a rigid wall extending substantially entirely over one side of the diaphragm and parallel thereto to form a confined fluid space, the clearance between the adjacent surfaces of the diaphragm and the wall when the valve member is closed, being a minor fraction of the total flexing movement of the diaphragm when the valve member is moved from closed to open positions, an orifice of relatively small diameter serving to vent said space and serving to materially impede fluid flow into said space, and means forming a fluid space upon the other side of the diaphragm, said fluid space having a venting orifice of materially greater diameter than said first-named orifice to freely subject the diaphragm to pressure.

8. In a fluid pressure regulator, a body having an inflow passage for connection to a relatively high pressure source of fluid and also having an outflow passage for connection with a low pressure point of fluid supply, a stationary valve seat formed within said body, a movable valve member cooperating with the seat and having a travel of movement in opposite directions between open and closed positions to control flow of fluid through the body, a flexible diaphragm connected to the valve member to effect movements of the same, means forming a fluid chamber on one side of the diaphragm, said chamber having an orifice of relatively large diameter for communication with the outflow side of the regulator and fluid pressure within the same tending to flex the diaphragm in a direction to move the valve member towards closed position with respect to the valve seat, means forming a closed gas chamber upon the other side of the diaphragm, said last-mentioned gas chamber serving to contain a predetermined amount of trapped gas under pressure, whereby such pressure tends to flex the diaphragm in a direction to move the valve member towards open position, a rigid baffle wall within said last-mentioned chamber and extending across said other side of the diaphragm, the clearance between the adjacent faces of said baffle and said diaphragm, when the valve member is closed against said seat, being substantially less than one-half of the total flexing movement of the diaphragm in moving the valve member between full-open and closed positions, and an orifice of smaller diameter than said first-named orifice for establishing flow attenuating communication between the space formed by the said clearance and the remainder of said gas chamber.

MARVIN H. GROVE.